Nov. 27, 1923.

I. TROLLEY

TRACTOR HITCH 1,475,206

Original Filed July 17, 1918   3 Sheets-Sheet 2

WITNESSES

INVENTOR
Isaac Trolley
BY
Rogers Kennedy Campbell
ATTORNEYS

Nov. 27, 1923.
I. TROLLEY
TRACTOR HITCH
Original Filed July 17, 1918   3 Sheets-Sheet 3
1,475,206
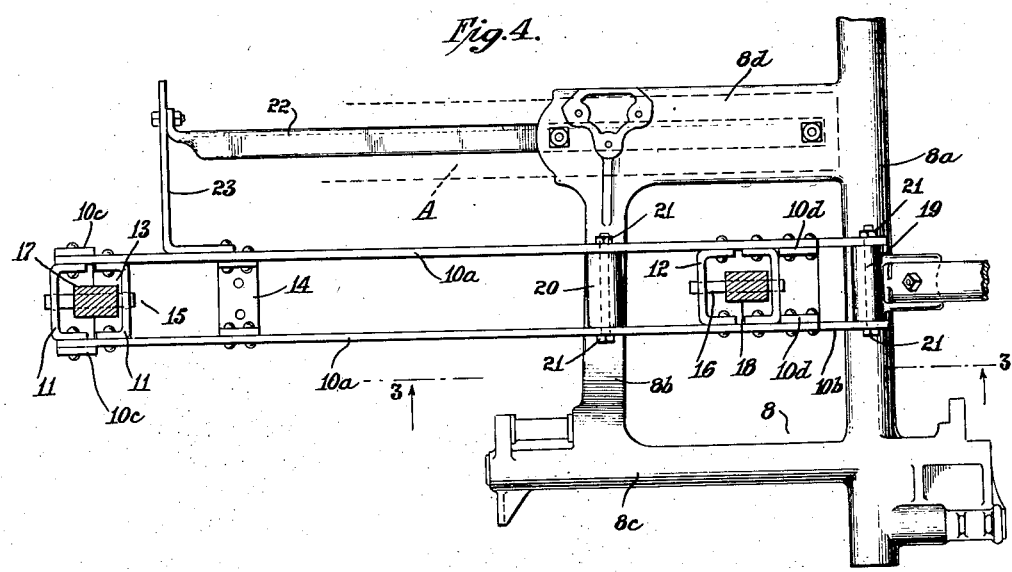
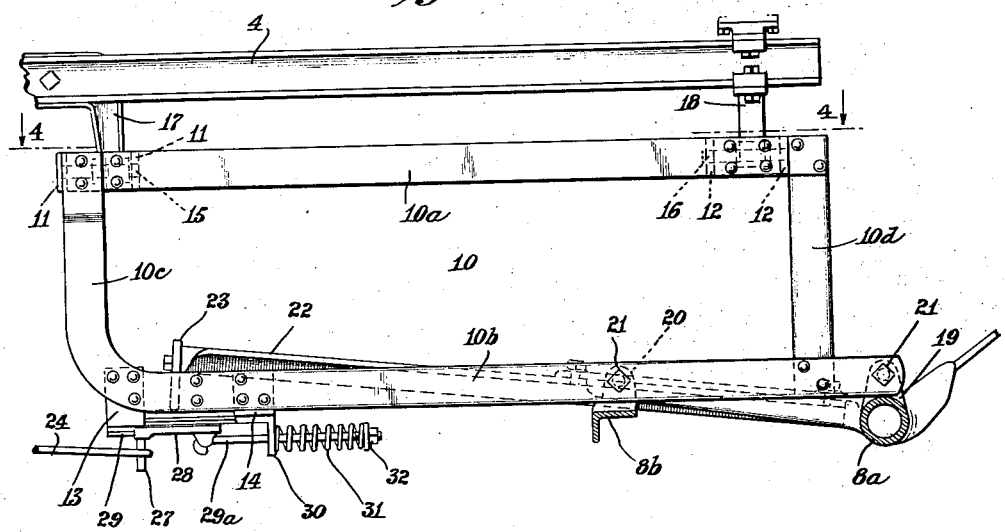

Patented Nov. 27, 1923.

1,475,206

UNITED STATES PATENT OFFICE.

ISAAC TROLLEY, OF POUGHKEEPSIE, NEW YORK, ASSIGNOR, BY MESNE ASSIGNMENTS, TO MOLINE PLOW COMPANY, INCORPORATED, OF MOLINE, ILLINOIS, A CORPORATION OF VIRGINIA.

TRACTOR HITCH.

Application filed December 26, 1918. Serial No. 268,389.

*To all whom it may concern:*

Be it known that I, ISAAC TROLLEY, a citizen of the United States, residing at Poughkeepsie, in the county of Dutchess and State of New York, have invented certain new and useful Improvements in Tractor Hitches, of which the following is a specification, reference being had therein to the accompanying drawing.

The invention relates to tractor hitches.

It relates particularly to a tractor hitch for connecting a two wheel, unstable tractor to a mowing machine.

Two wheeled tractors of the unstable type are generally connected to implements so that the implements stabilize the tractor and form, in effect, a part of the tractor unit. The tractive effort of a tractor of this type causes a downward re-action on the frame coupling it to the implement and this reaction must be taken care of by the implement without interfering with its operation and without unduly increasing the draft. In addition, the draft connection to the implement must be such that the proper flexibility is secured so that the implement car adapt itself to inequalities in the surface of the ground. Furthermore, portions of the implement usually extend considerably to one side of the longitudinal center line of the tractor, and the draft connections must be arranged so that the draft is equalized in a proper manner. The present invention is directed to a solution of these problems.

The general object of the invention is to provide an improved hitch for connecting an implement to a tractor. Another object is to provide an improved hitch for connecting a two wheeled tractor of the unstable type to an implement such as a mowing machine.

Other objects and advantages of the invention will hereinafter appear.

In the accompanying drawings:

Fig. 3 is a side elevation on an enlarged scale of the connecting draft member, and parts of the tractor and mowing machine frame connected thereto.

Fig. 4 is a horizontal sectional plan view of the same on the line 4—4 of Fig. 3.

Figure 1:
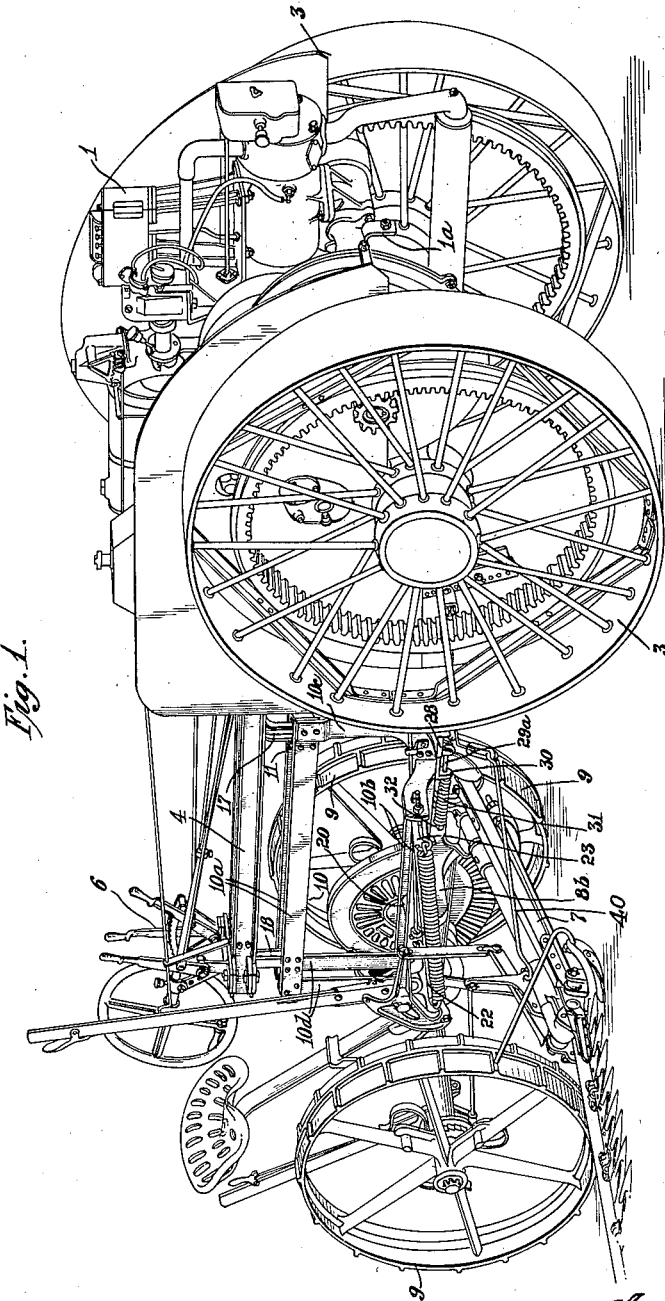
Fig. 1 is a perspective view of a tractor and mowing machine connected together in accordance with my invention.

Referring to the drawings:

The tractor herein shown as illustrating the application of my invention, consists of a power unit 1 comprising a suitable frame $1^a$ giving support to a motor, in the present case in the form of a gasoline engine, and sustained by two power driven traction wheels 3 operated by the engine. Connected with the frame $1^a$ on a vertical axis, is a horizontal beam 4 which gives support to a horizontal pinion 5 meshing with a horizontal segmental rack $5^a$ on the frame $1^a$, the rotation of this pinion, assuming that the beam is held against horizontal movement, causing the frame of the power unit to be turned on said vertical axis and thus effecting the steering of the tractor. The rotation of the pinion to steer the tractor, and the control of the driving mechanism of the tractor, is effected by controlling devices 6 mounted on the rear end of the beam 4, and as these parts are the same as those described in an application for patent filed by me on the 17th day of July 1918, Serial No. 245,410, reference may be had to said application for a more detailed description than is here given, the above description being sufficient for an understanding of this invention.

The mowing machine 7 herein shown as connected with the tractor by my improved draft member, is of the usual and ordinary construction, having a sustaining frame 8 provided with a rear transverse frame bar $8^a$, a front transverse frame bar $8^b$, and two fore-and-aft extending frame bars $8^c$ and $8^d$ connecting the transverse bars together and constituting a unitary frame structure, the said frame being sustained by the usual ground wheels 9 and giving support to the operative parts of the machine, including the cutter bar, the driving mechanism therefor, the adjusting levers, and the seat bar and driver's seat.

The fore-and-aft frame bar $8^d$ is formed, as usual, with a pole socket which, when the implement is drawn through the field by draft animals, receives a draft pole A indicated by dotted lines in Fig. 4, but which when the implement is connected with the tractor, is removed to admit of the application of my improved connecting draft member, now to be described.

The draft member 10 consists of an upright frame structure, which extends beneath and supports the beam 4 of the tractor and is connected thereto, being also connected with the mowing machine frame, so that it unites the mower and the tractor and causes the mower to trail behind the tractor in the travel of the latter. This frame structure is built up of two open rectangular side frames, comprising each, upper and lower frame bars $10^a$ and $10^b$, and front and rear vertical frame bars $10^c$ and $10^d$, which bars are connected rigidly together in fixed relation. The two open side frames thus formed, are disposed side by side in spaced parallel relations, and are firmly connected together by means of a pair of spacing plates 11, fixed between the upper bars $10^a$ at the front, and a pair of spacing plates 12 fixed between the said bars at the rear, two hanger brackets 13 and 14 being fixed between the lower bars $10^b$, one behind the other, at the front, the said spacing plates and hanger brackets thus serving to connect the two side frames together and forming a unitary draft frame structure.

The support of the beam 4 of the tractor by this frame 10 is afforded by means of a forward horizontal longitudinal pin 15, sustained by the spacing plates 11, and a rear horizontal longitudinal pin 16, sustained by the spacing plates 12, which pins are in longitudinal alignment with each other and which are loosely encircled by the lower ends of two vertical arms 17 and 18 depending from the under side of the beam 4 respectively at its front and rear. By this means, when the beam is supported by the draft frame, a relative sliding movement of the tractor and draft frame is permitted in a fore-and-aft direction, in which movement the arms will slide back and forth on the pins; and also a relative rocking motion of the parts is permitted, in which motion the arms will turn or lock transversely on the pins as an axis.

In order to enable the draft frame 10 to be connected with the mower frame, the transverse frame bars $8^a$ and $8^b$ of the mower are provided at about a point midway of their length, with upwardly extending transverse lugs 19 and 20 respectively, which extend between the bars $10^b$ of draft frame and which are fastened thereto by bolts 21 passing through the bars and lugs, as shown more particularly in Figs. 3 and 4. The parts are further connected together by means of a draft rod 22 extending at its rear end and secured in the pole socket in the frame bar $8^d$, whence the rod extends forwardly and is bolted to the outer end of a transverse arm 23 secured at its inner end to the lower frame bar $10^b$ of the draft frame. Due to this construction and arrangement of the parts, the draft of the tractor on the draft frame 10, transmitted thereto in the manner to be presently described, is in turn transmitted to the frame of the mowing machine by the draft rod 22 at the point on the mower frame where the draft is applied by the usual pole when the machine is drawn by draft animals. The draft is also transmitted to the mowing machine frame, through the lugs 19 and 20 at a point on the frame further stubbleward, the combined application of the draft forces to the mower frame at these two points, causing the mower to be drawn along behind the tractor straight and square in the line of travel, and without subjecting the parts to injurious or severe side twisting strains.

Figure 2:
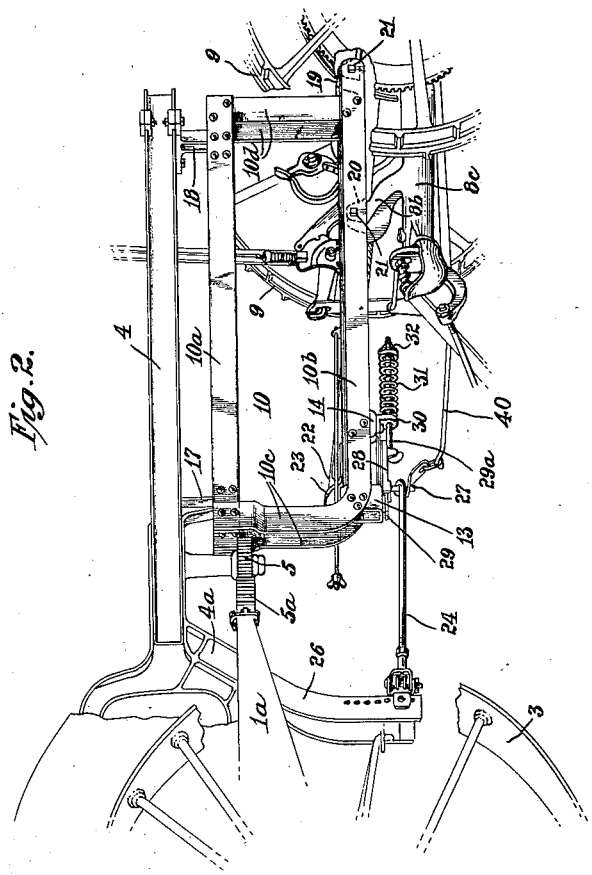
Fig. 2 is a perspective view of the improved connecting draft member, and the adjacent parts of the tractor and mowing machine to which the draft member is connected.

The draft pull of the tractor is applied to the draft frame 10 through the medium of a draft link 24 (Fig. 2), which is pivoted by means of a vertical pivot pin to a clevis 26, which in turn is pivotally connected on a horizontal axis to the lower end of a draft arm $4^a$ depending from the forward end of the beam 4. This draft link extends rearwardly, and is coupled at its rear end to a pin 27 depending from a slide 28 movable back and forth on guides 29 sustained by the hanger brackets 13 and 14. A rod $29^a$ is connected with the slide and passes loosely through a lug 30 on the hanger bracket 14, the rod beyond the bracket being encircled by a spiral spring 31, which bears at one end against the lug and at its opposite end against a head 32 on the end of the rod. The spring acts to pull the slide rearwardly against the tendency of the draft link to pull it forwardly, and the spring thereby acts to cushion the sudden pull or jerk of the tractor on the draft frame 10, the beam 4 and frame 10 in such cushioning actions moving relatively to each other, with the arms 17 and 18 of the beam sliding on the pins 15 and 16 on the frame.

Flexibly connected to the pin 27 is a link 40, to the other end of which is connected the cutting mechanism. This link is normally idle, but, if the cutters should strike an obstruction or, particularly, if the finger bar should strike an obstruction, the pin 27 is pulled forward sufficiently against the tension of spring 31 by the draft of the tractor to cause a portion of the draft to be transferred to the draft link 40 so that the tractor pulls directly on the cutting mechanism, thus preventing unusual strain on the cutting connections and reducing to a minimum the possibility of breakage. In other words, the draft is normally applied where it should be and is automatically shifted to take care of unusual conditions. For example, on rough, heavy, or uphill work, the draft rod 40 will come into action and transfer some of the draft directly to the cutting mechanism, thereby relieving the strain on the connections of the cutting mechanism to the mower frame.

It will be noted from the foregoing description, that the tractor and connected mowing machine constitute in effect a unitary power driven implement, in which the parts are disposed in compact relations, and in which the draft pull of the tractor is applied to the mower in the most favorable manner for effective action in the field. Also it will be noted that the mowing machine itself acts to support the power unit or tractor and preserves its horizontal equilibrium, the control of the tractor and of the usual levers of the mower, being conveniently effected by the driver occupying the customary driver's seat on the mowing machine.

In the foregoing description and accompanying drawings, I have set forth my invention in the particular detailed form which I prefer to adopt and which in practice has been found to answer to a satisfactory degree the ends to be attained. It will be understood, however, that these details may be variously changed and modified by the skilled mechanic without departing from the limits of the invention; and further, it will be understood that the invention is not limited to any particular form or construction of the parts, except in so far as such limitations are specified in the claims.

Having thus described my invention, what I claim and desire to secure by Letters Patent of the United States is, as follows:

1. The combination with a tractor of the unstable type constituting an independent power unit, of an implement having a supporting frame provided with two transverse frame bars, an intermediate frame for connecting the tractor to the implement rigidly connected with said transverse frame bars and connected with the tractor to stabilize the same, and means for transmitting the draft of the tractor to said intermediate frame.

2. The combination with a tractor of the unstable type constituting an independent power unit, of a mowing machine having a wheeled supporting frame in which the mowing mechanism is mounted, an intermediate frame fixedly connected with the supporting frame and connected with the tractor to stabilize the same, and resilient means for transmitting the draft of the tractor to the intermediate frame.

3. In combination with a tractor comprising an unstable power unit, an implement, an intermediate draft frame connected with the frame of the implement and stabilizing the power unit, said power unit and draft frame being movable relatively to each other in the direction of travel, a draft device connected with the power unit, a slide guided on the draft frame and connected with the draft device, and a spring acting on the slide in opposition to the pull of the draft device.

4. The combination with a two wheel tractor of the unstable type comprising an independent power unit having a rearwardly extending coupling frame pivoted to it to swing about a substantially vertical axis in a plane relatively high above the ground, of a mowing machine having a wheeled supporting frame, a cutting mechanism, an intermediate frame connecting the tractor coupling frame with the mowing machine for stabilizing the tractor and mower and for absorbing the reaction of the tractor, said frame permitting the mowing machine to move relative to the tractor about a substantially longitudinal, horizontal axis, and separate means for transmitting the draft of the tractor to the intermediate frame and cutting mechanism.

5. In combination with a tractor comprising an unstable power unit, an implement having a frame provided with a pole socket, an intermediate draft frame connected with the frame of the implement and giving support to the power unit, a draft rod connected with the draft frame and secured in said pole socket, and means for applying the draft pull of the tractor to the draft frame.

6. In combination with a tractor comprising an unstable power unit, an implement having a frame provided with a front transverse frame bar and with a rear transverse frame bar, an intermediate draft frame connected to said frame bars and giving support to the power unit, and means for applying the draft pull of the tractor to said draft frame.

7. In combination with a tractor comprising an unstable power unit, an implement having a frame provided with a front transverse frame bar, a rear transverse frame bar, and a fore-and-aft extending frame bar, an intermediate draft frame connected with said front and rear transverse bars and giving support to the power unit, a draft rod connected respectively with the draft frame and said fore-and-aft frame bar, and means for applying the draft pull of the tractor to said draft frame.

8. The combination with a tractor of an implement to be pulled thereby, and means connecting the tractor and one portion of the implement serving, when the draft required to pull the implement exceeds a predetermined value, to transfer a portion of said draft to another portion of said implement.

9. The combination with a tractor of a mowing machine having cutting mechanism, and means connecting the tractor with the mowing machine serving when the draft required to pull the machine exceeds a predetermined value, to transfer a portion of the draft directly to the cutting mechanism.

10. The combination with a tractor of a mowing machine having cutting mechanism, and means connecting the tractor with the machine serving when the cutting mechanism strikes an obstruction to transfer a portion of the draft of the tractor directly to the cutting mechanism.

11. The combination with a tractor of a mowing machine having cutting mechanism, and means connecting the tractor and the mowing machine including a resilient connection for transmitting draft to the machine, arranged so that, when the resilient connection is moved because of greater draft required by the cutting mechanism striking an obstruction, a portion of the draft is transmitted directly to the cutting mechanism.

12. The combination with a tractor of a mowing machine having cutting mechanism and a stub pole connection, a frame connecting the tractor with the mower arranged to swing about a substantially horizontal axis, connections between the frame and the mower for transmitting the draft to the stub pole connection of the mower, means for transmitting the draft of the tractor to said frame including a resilient connection, and means connecting the resilient connection and the cutting mechanism so that, when an increased draft is required to pull the cutting mechanism, a portion of the draft of the tractor is transmitted directly to said cutting mechanism.

13. The combination with a tractor of the unstable type, of a mowing machine, and means for connecting the tractor to said machine to transmit draft to the machine and to stabilize the tractor, said means being arranged so that, when the draft required by the machine exceeds a predetermined value, a portion of the draft will be transferred to a portion of the machine other than where the draft is normally applied.

14. The combination with a tractor of the unstable type of a mowing machine having cutting mechanism, and means connecting the tractor with the mowing machine for stabilizing the tractor and transmitting draft to the machine, said means being arranged so that when the draft required to pull the mower exceeds a predetermined value, a portion of the draft will be transferred directly to the cutting mechanism.

15. The combination with a tractor of the unstable type of a mowing machine having a cutting mechanism, means for connecting the tractor with the mowing machine for stabilizing the tractor and transmitting draft to the machine, said means including a resilient connection and mechanism whereby, when the draft required to pull the mower exceeds a predetermined value, a portion of the draft will be transferred directly to the cutting mechanism.

16. The combination with a tractor of the unstable type of a mowing machine having a cutting mechanism, means for connecting the tractor with the mowing machine to stabilize the tractor and to transmit draft to the machine, said means permitting movement of the machine relative to the tractor about a substantially longitudinal horizontal axis to permit the machine to adjust itself to inequalities in the surface of the ground, said means also including mechanism whereby, when the draft required to pull the mower exceeds a predetermined value, a portion of the draft is transferred to the cutting mechanism.

17. The combination with a tractor of the unstable type of a mowing machine, means for connecting the tractor with the mowing machine to stabilize the tractor and transmit draft to the machine, said means being arranged so as to permit the mower to move relative to the tractor longitudinally and about a substantially horizontal axis and including a resilient connection through which draft is transmitted to the mower.

18. The combination with a tractor of the unstable type of a mowing machine, and means for connecting the tractor with the mowing machine to stabilize the tractor and transmit draft to the machine, the center line of draft of said mower being off-set relative to the center line of said tractor and said connecting means including means for transferring the draft of the tractor to the center line of draft of the mowing machine.

19. The combination with a tractor of the unstable type having a coupling frame pivoted to it to swing about a substantially vertical axis, of a mowing machine, connecting means pivoted to the coupling frame to swing about a substantially horizontal axis and having an extension for transmitting draft to the center line of the mower, means for transmitting the draft of the tractor to the connecting means including a resilient connection, and means connecting the cutting mechanism with the resilient connection arranged so that, when an increased draft is required to pull the cutting mechanism, a portion of the draft of the tractor will be transferred directly to the cutting mechanism.

20. The combination with a tractor of the unstable type of a mowing machine having cutting mechanism, means connecting the tractor and the mower for stabilizing the tractor and transmitting draft to the mower, said means permitting the mower to move relatively to the tractor about a substantially vertical and about a substantially horizontal axis for steering purposes and for permitting the mower to adjust itself to inequalities in the surface of the ground respectively, said means also including mechanism whereby, when an increased draft is required to pull the cutting mechanism, a portion of the draft will be transmitted directly to the cutting mechanism.

21. The combination with a tractor of the unstable type having a coupling frame pivoted to it to swing in a plane relatively high above the ground about a substantially vertical axis and carrying tractor controls arranged to swing with the frame, of a mowing machine having a driver's seat, and means for connecting the mower with the coupling frame to stabilize the tractor and transmit draft to the mower, said means being arranged to permit the mower to move relative to the coupling frame about a substantially longitudinal horizontal axis and also so that the tractor controls can be readily operated by a driver seated on the driver's seat on the mowing machine.

In testimony whereof, I have affixed my signature hereto.

ISAAC TROLLEY.